United States Patent
Wang et al.

(10) Patent No.: US 8,458,550 B2
(45) Date of Patent: Jun. 4, 2013

(54) PROTOCOLS FOR MULTI-HOP RELAY SYSTEM WITH CENTRALIZED SCHEDULING

(75) Inventors: Haifeng Wang, Shanghai (CN); Ting Zhou, Shanghai (CN); Jing Xu, Shanghai (CN)

(73) Assignee: Nokia Siemens Networks Oy, Espoo (FI)

( * ) Notice: Subject to any disclaimer, the term of this patent is extended or adjusted under 35 U.S.C. 154(b) by 270 days.

(21) Appl. No.: 12/920,658

(22) PCT Filed: Feb. 24, 2009

(86) PCT No.: PCT/FI2009/050148
§ 371 (c)(1),
(2), (4) Date: Sep. 17, 2010

(87) PCT Pub. No.: WO2009/109698
PCT Pub. Date: Sep. 11, 2009

(65) Prior Publication Data
US 2011/0022917 A1 Jan. 27, 2011

Related U.S. Application Data

(60) Provisional application No. 61/034,628, filed on Mar. 7, 2008.

(51) Int. Cl.
*H04L 1/18* (2006.01)
(52) U.S. Cl.
USPC .............................. 714/748; 714/752; 714/799
(58) Field of Classification Search
USPC .................................. 714/748, 799, 752, 807
See application file for complete search history.

(56) References Cited

U.S. PATENT DOCUMENTS

| | | | | |
|---|---|---|---|---|
| 7,434,150 | B1 * | 10/2008 | Barash | 714/807 |
| 7,526,705 | B2 * | 4/2009 | Boer et al. | 714/748 |
| 2004/0039979 | A1 * | 2/2004 | Garani | 714/752 |
| 2004/0039986 | A1 | 2/2004 | Solomon et al. | 714/799 |

(Continued)

FOREIGN PATENT DOCUMENTS

| WO | WO 01/73973 A1 | 10/2001 |
|---|---|---|
| WO | WO 03/030436 A2 | 4/2003 |

OTHER PUBLICATIONS

Institute of Electrical and Electronics Engineers (IEEE) Standard for Local and metropolitan area networks Part 16: Air Interface for Fixed and Mobile Broadband Wireless Access Systems, IEEE Std 802.16e-2005, Feb. 2006.

(Continued)

*Primary Examiner* — Fritz Alphonse
(74) *Attorney, Agent, or Firm* — Harrington & Smith

(57) ABSTRACT

Various example embodiments are disclosed herein. In an example embodiment, a method of transmitting data via a wireless transmission path that may include a user equipment as a first end point, a base station as second end point, and at least one relay station as an intermediate point(s). The method may include receiving a data transmission from a prior point in the transmission path. Substantially simultaneously: forwarding the received data to the next point in the transmission path, and determining if the received data is corrupt. Transmitting a transmission message to the next point in the transmission path indicating whether or not the received data was corrupt. And, if the data is not corrupt, transmitting a receipt message to the prior point indicating that the data was uncorrupt when received.

25 Claims, 13 Drawing Sheets

U.S. PATENT DOCUMENTS

| | | | |
|---|---|---|---|
| 2005/0005196 A1 | 1/2005 | Bune | 714/18 |
| 2005/0036452 A1 | 2/2005 | Banerjee et al. | 370/252 |
| 2005/0281192 A1 | 12/2005 | Nadeau et al. | 370/217 |
| 2008/0212466 A1* | 9/2008 | Hsieh et al. | 370/229 |
| 2009/0247241 A1* | 10/2009 | Gollnick et al. | 455/574 |

OTHER PUBLICATIONS

XP-002515198, IEEE Std 802. 16e-2005, Amendment 2 and Corrigendum 1 to IEEE Std 802. 16e-2005, pp. 626-630.

* cited by examiner

PROTOCOLS FOR MULTI-HOP RELAY SYSTEM WITH CENTRALIZED SCHEDULING

CROSS-REFERENCE TO RELATED APPLICATIONS

This application is the National Stage of International Application No. PCT/FI2009/050148, filed Feb. 24, 2009, which claims the benefit of Provisional Application No. 61/034,628, filed Mar. 7, 2008, the disclosures of which are incorporated herein by reference in their entirety.

TECHNICAL FIELD

This description relates to wireless networks.

BACKGROUND

Typically, wireless networks include a base station that generally couples a wired network with a wireless network and mobile station that uses the wireless network. Often these two devices are in direct communication. Occasionally, intermediate devices relay data and various communications between the base station and the mobile station. For example, the mobile station and the base stations may be physically too far away from each other to communicate. In such an instance, a typically relay station physically sits in between the base and mobile stations. The relay station may be physically close enough for communication with the mobile station, and physically close enough for communication with the base station. Therefore, the base station may send data to the relay station which then forwards the data to the mobile station, and vice versa. Using one or more relay stations, a wireless network may be physically extended.

An illustrative analogy may be a baseball game in which the outfielder cannot physically throw the ball to the catcher, but can physically throw it to the second baseman. The second baseman may then throw the ball to the catcher. In this analogy the second baseman may act as the relay station between the outfielder (mobile station) and the catcher (base station). The ball may represent the data or other communication.

SUMMARY

Various example embodiments are disclosed herein. In an example embodiment, a method of transmitting data via a wireless transmission path that may include a user equipment as a first end point, a base station as second end point, and at least one relay station as an intermediate point(s). The method may comprise: receiving a data transmission from a prior point in the transmission path. Substantially simultaneously: forwarding the received data to the next point in the transmission path, and determining if the received data is corrupt. Transmitting a transmission message to the next point in the transmission path indicating whether or not the received data was corrupt. And, if the data is not corrupt, transmitting a receipt message to the prior point indicating that the data was uncorrupt when received.

According to an example embodiment, an apparatus comprising: a controller, a memory coupled to the controller, and a wireless transceiver coupled to the controller. Wherein the apparatus is adapted to receive a data transmission from a prior point in a transmission path, wherein the transmission path includes a user equipment as a first end point, a base station as second end point, and at least one apparatus as an intermediate point(s). Substantially simultaneously: forward the received data to the next point in the transmission path, and determine if the received data is corrupt. Transmit a transmission message to the next point in the transmission path, wherein the transmission message indicates whether or not the received data was corrupt. And, if the data is not corrupt, transmit a receipt message to the prior point, wherein the receipt message indicates that the data was uncorrupt when received.

According to an example embodiment, a method of transmitting data via a wireless transmission path that includes a user equipment as a first end point, a base station as second end point, and at least one relay station as an intermediate point(s). The method comprising: receiving, from the base station, a resource block allocation allowing for the transmission of data to a next point in the transmission path. Receiving a data transmission from a prior point in the transmission path, wherein the data transmission includes error detection information. Determining, using at least in part the error detection information, if the data is corrupt. And, if the data is corrupt, requesting that the data be retransmitted by the prior point of the transmission path, and not using the resource block allocation.

According to an example embodiment, an apparatus comprising: a controller, a memory coupled to the controller, and a wireless transceiver coupled to the controller. Wherein the apparatus is adapted to: receive a resource block allocation allowing for the transmission of data to a next point in a transmission path, wherein the transmission path includes a user equipment as a first end point, a base station as second end point, and at least one apparatus as an intermediate point (s). Receive a data transmission from a prior point in the transmission path, wherein the data transmission includes error detection information. Determine, using at least in part the error detection information, if the data is corrupt. And, if the data is corrupt, request that the data be retransmitted by the prior point of the transmission path, and not using the resource block allocation.

The details of one or more implementations are set forth in the accompanying drawings and the description below. Other features will be apparent from the description and drawings, and from the claims.

DETAILED DESCRIPTION

Figure 1:
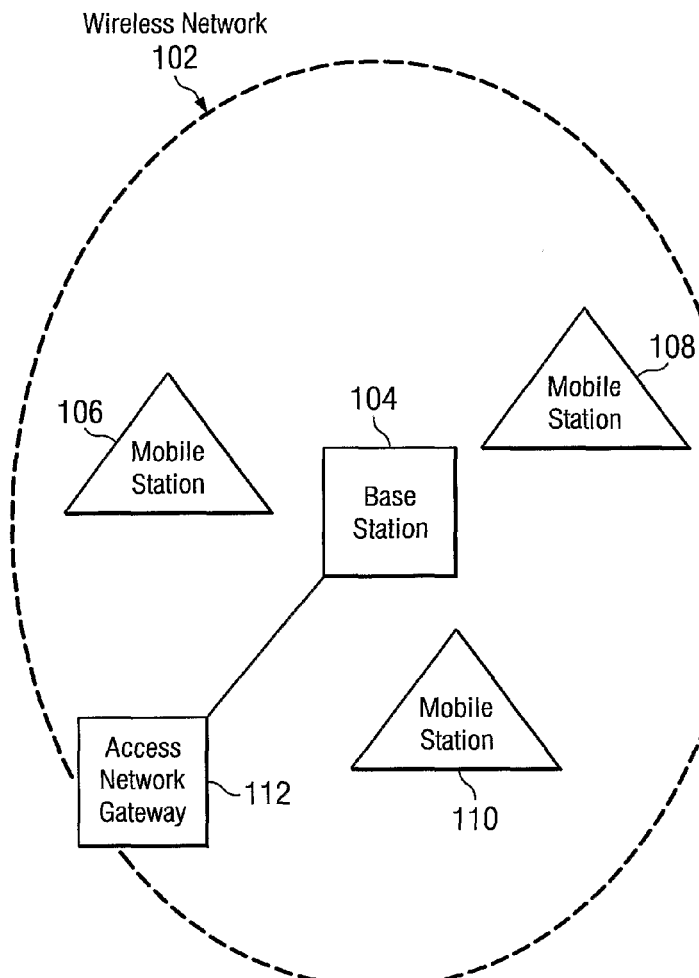
FIG. 1 is a block diagram of a wireless network in accordance with an example embodiment of the disclosed subject matter.

Referring to the Figures in which like numerals indicate like elements, FIG. 1 is a block diagram of a wireless network 102 including a base station (BS) 104 and mobile stations (MS) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MS106, 108 and 110) are shown, any number of base stations and mobile stations may be provided in network 102. Also, although not shown, mobile stations 106, 108 and 110 may be coupled to base station 104 via relay stations or relay nodes, for example. An access network controller or gateway 112 may be coupled to the base stations (e.g., BS 104) via wired or wireless links. In an example embodiment, access network gateway 112, if present, may provide control for one or more network tasks or functions, either for or in cooperation with one or more base stations in network 102.

Although not shown, access network gateway 112 and base station 104 may each be connected to a wired network, such as a Local Area Network, a Wide Area Network (WAN), the Internet, etc.

Figure 2:
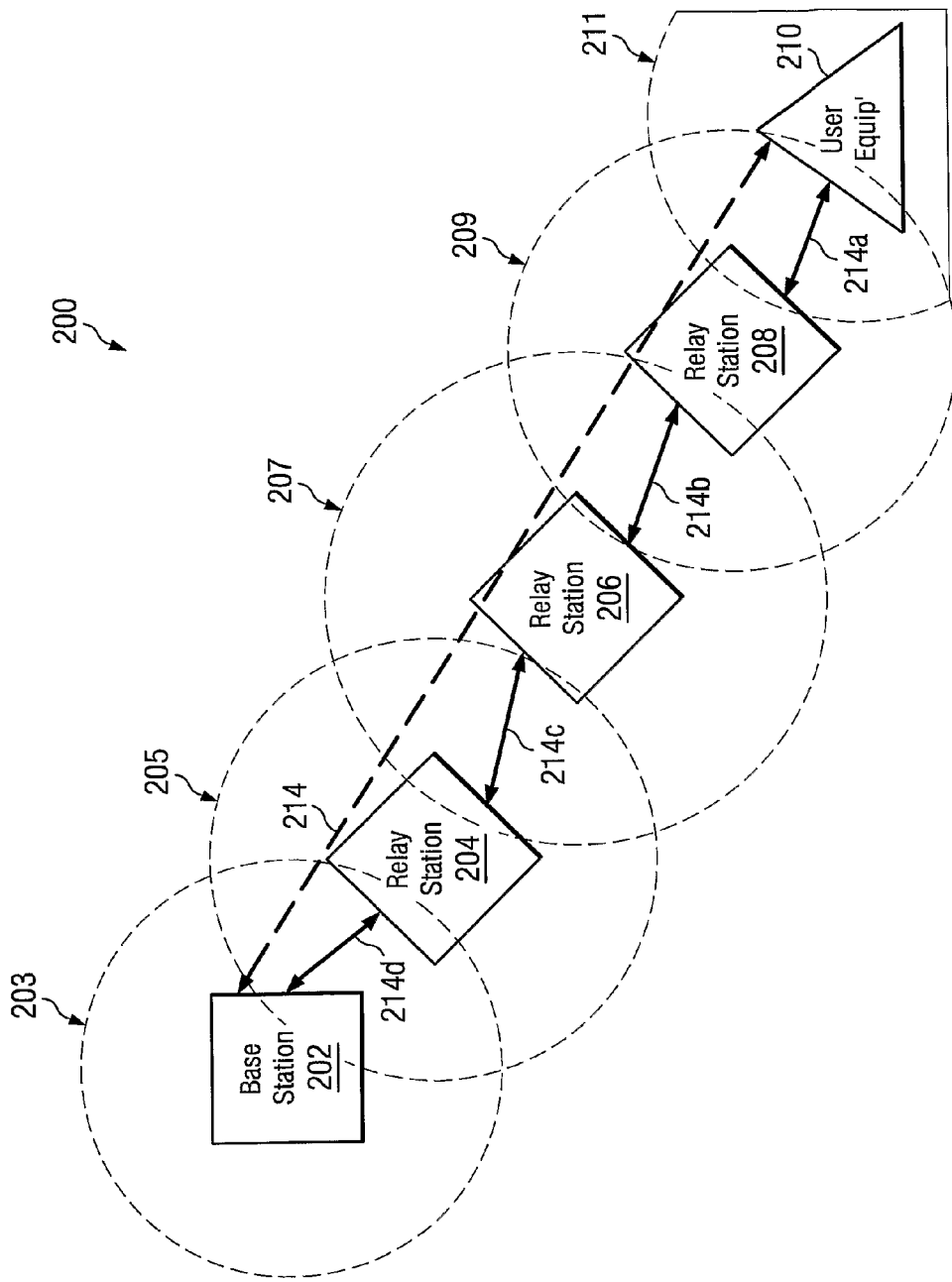
FIG. 2 is a block diagram illustrating a system in accordance with an example embodiment of the disclosed subject matter.

FIG. 2 is a block diagram illustrating a system 200 in accordance with an example embodiment of the disclosed subject matter. In one embodiment, the system 200 may include a base station 202, user equipment (UE) 210 and a series of relay stations (e.g., relay stations 204, 206 and 208). In various embodiments, the user equipment 210 may include a mobile station (e.g., the mobile stations shown in FIG. 1).

In various embodiments, the user equipment 210 may include a range of communication 211. In various embodiments, this range 211 may be the distance of a wireless signal transmitted from the UE can travel. The range 211 may, in one embodiment, be insufficient to reach the base station 202. Therefore, in some embodiments, one or more relay stations may be used to forward data between the user equipment 210 and the base station 202.

For example, in one embodiment, while the range 211 may not reach the base station 202, the range 211 may overlap with the relay station (RS) 208. Therefore, the user equipment 210 may transmit data to the relay station 208. The relay station 208 may include a range of communication 209 that allows communication with relay station 206. The relay station 208 may forward the data to the relay station 206. This middle relay station 206 may forward the data to relay station 204 that is within the range of communication 207. Finally, the relay station 204 may forward the data to the base station 202, which is within the range of communication 205. Likewise, the base station 202 may communicate with the user equipment 210, which is outside the range of communication 203, using the intermediate relay stations 204, 206 & 208.

In such an embodiment, a wireless transmission path 214 may exist between the base station 202 and the user equipment 210. The transmission path 214 may include a number of transmission links (e.g., links 214a, 214b, 214c, and 214d) and a number of transmission points (e.g., points 210, 208, 206, 204, and 202). In one embodiment, the user equipment 210 may function as a first end point in the transmission path 214; the base station 202 may function as a second send point; and one or more relay stations (e.g., relay stations 204, 206, and 208) may serve as intermediate points in the transmission path. Such an embodiment may be considered a multi-hop system as the data is said to hop from transmission point to transmission point. Conversely, a system that involves only the base station and the user equipment may be a single-hop system.

In general, there may be two kinds of resource management mechanisms in multi-hop relay system, centralized and distributed scheduling. In a centralized scheduling embodiment, a base station 202 may allocate data transmission resources or resource blocks (e.g., download and upload bandwidth, time slices, etc.) for all the links or points in the transmission path 214. In a distributed scheduling embodiment, each station (BS/RS) may allocate data transmission resources for the adjacent link or point. Often centralized scheduling embodiments may involve larger latency because any requests for bandwidth frequently go to the BS 202. However, such an embodiment may be the focus of multi-hop systems due to the simpler protocol behavior and interference management compared to distributed scheduling embodiments.

In a multi-hop system, relay stations may extend the base station coverage and/or increase throughput. In various embodiments, a large end-to-end latency may exist, as one or more RSs may be involved in the transmission path. The latency problem may be more severe for some embodiments that make use of centralized scheduling. In such an embodiment, any bandwidth requests may go to the BS and then the subsequent resource block allocation comes from BS 202 to UE 210 hop by hop.

In various embodiments, the data may become corrupt as it travels along the transmission path 214. In this context the term "corrupt" may mean errors in the data that occur during transmission or retrieval, introducing unintended changes to the original data (e.g., ones may be turn into zeros, and vice versa). In some embodiments, the corruption may have a number of causes. In various embodiments, the corruption may occur due to, for example, environmental conditions (e.g., walls, clouds, etc.), interference from other wireless transmissions or devices (e.g., other relay stations, microwave ovens, etc.), hardware failure, etc.

In one embodiment, data corruption may be ameliorated by the use of error detection information. Such information may be added to the data transmission by the transmitting device and used by the receiving device to determine whether or not the data was corrupted during the transmission. In various embodiments, the error detection information may include the use of check sums, cyclic redundancy checks (CRCs), cryptographic hash functions, parity schemes, redundancy schemes, polarity schemes, horizontal or vertical redundancy checks, etc.; although, it is understood that the above are merely a few illustrative examples to which the disclosed subject matter is not limited.

In various embodiments, each intermediate point and/or the end points in the transmission path 214 may determine whether or not the data has become corrupt. In some embodiments, if the data has become corrupt, the receiving point may request that the data be retransmitted, in the hope that the re-transmitted data may be received in an uncorrupted state. In other embodiments, the intermediate point may request that the data be retransmitted in a particular way that might increase the probability that the re-transmitted data may be received in an uncorrupted state (e.g., using another wireless channel, a certain encoding scheme, etc.).

In one embodiment, the receiving and transmitting the data may include the use of a protocol substantially compliant with a Hybrid Automatic Repeat-Request (HARQ) protocol. In various embodiments, the system 200 may make use of a protocol substantially compliant with the protocol colloquially known as "WiMax" or more formally known as IEEE 802.16, its derivatives, successors, or predecessors. *Institute of Electrical and Electronics Engineers (IEEE) Standard for Local and metropolitan area networks Part* 16: *Air Interface for Fixed and Mobile Broadband Wireless Access Systems*, IEEE Std 802.16e-2005, February 2006. Although, it is understood that the above is merely an illustrative example to which the disclosed subject matter is not limited.

Figure 3:
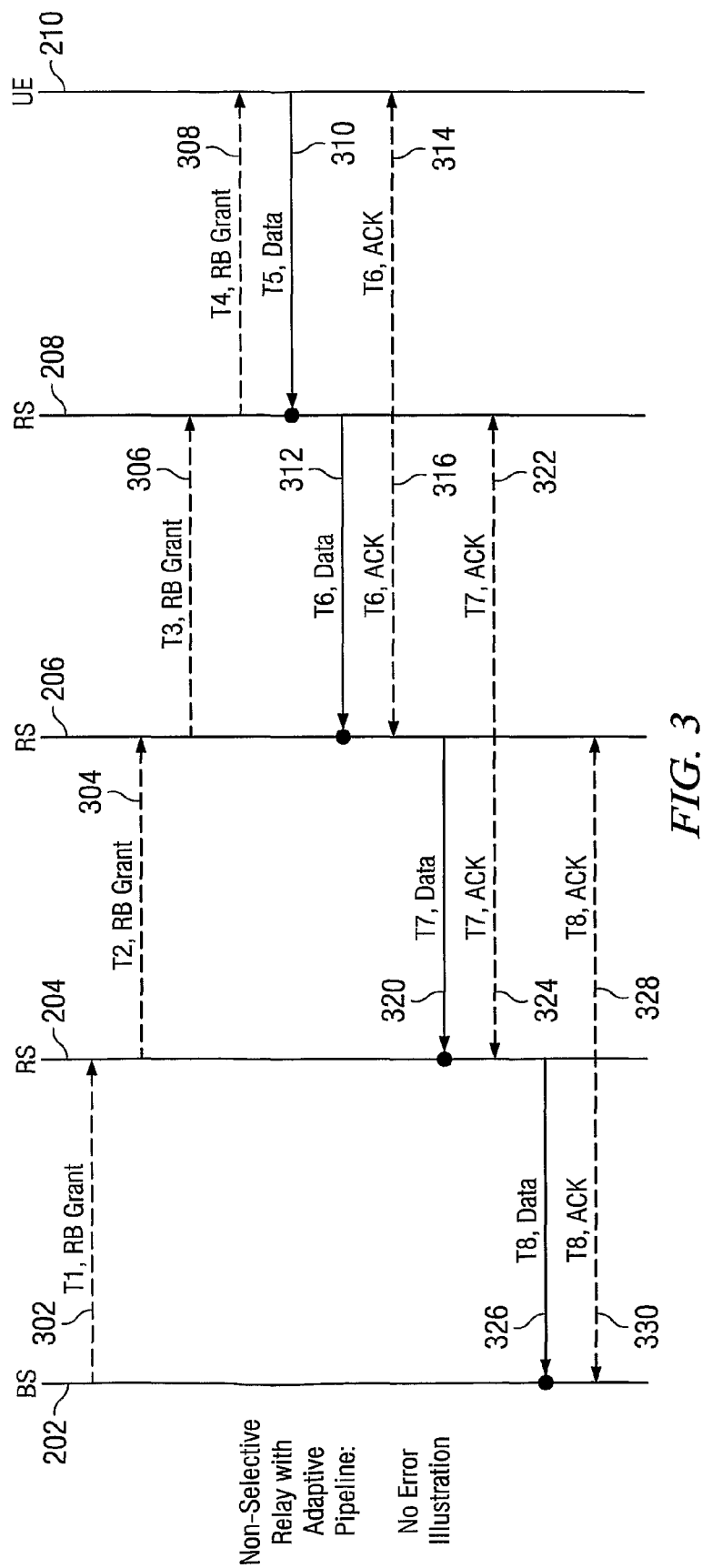
FIG. 3 is a timing diagram illustrating an apparatus and system in accordance with an example embodiment of the disclosed subject matter.

FIG. 3 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 3 illustrates an embodiment of system 200 that includes a non-selective relay of the data with an adaptive pipeline. The illustrated timing diagram shows the case in which no errors or data corruption occurs. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

As explained below in reference to FIGS. 3 and 4, the system in this embodiment may be considered to employ a non-selective relay in that data is forwarded regardless of whether or not the data is corrupt. The system in this embodiment may be considered to employ an adaptive pipeline in that resource blocks may be re-allocated when data becomes corrupted.

Transmission 302 illustrates that at time-one (T1) the base station 202 may allocate or grant a resource block allowing for the transmission of data along the transmission path. In various embodiments, the resource block may be part of an accounting scheme that controls the use of a particular resource (e.g., bandwidth, time slices, wireless channels, etc.) necessary for the transmission of data in this embodiment. In various embodiments, the resource blocks may be allocated in response to a request.

Transmissions 304, 306, and 308 illustrate that resource blocks may be allocated to all the transmission points within the transmission path. In various embodiment, the allocation may be centralized and managed by the BS 202.

Transmission 310 illustrates that, at time-five (T5) after receiving a resource block allocation, the UE 210 may transmit data to the next point in the transmission path, RS 208. In this embodiment, once the data has been transmitted to the next point in the transmission path, the UE 210 may consider the allocated resource block to be used. As such, in various embodiments, the transmission point may mark or otherwise indicate that its allocated resource block has been used. In other embodiments, the resource block may not be considered used until a receipt message 314 is received from the next point in the path.

Upon receipt of the data, the relay station 208 may, in one embodiment, substantially simultaneously forward the received data to the next point in the transmission path (RS 206) and determine if the received data is corrupt (denoted by the black dot). In various embodiments, the forwarding of data may include the amplification of the signal used to convey or transmit the data. As FIG. 3 illustrates the case in which no error or corruption occurs, transmission 316 illustrates that upon determining that the data is not corrupt a transmission or control message may be sent to the next point indicating that the data is not corrupt.

It is noted that, in one embodiment, both the transmission of the data (transmission 312) and the transmission of the transmission message (transmission 316) may occur during time slice six (T6). In various embodiments, since the transmission message 316 includes less data than the actual data transmission and therefore less time to send, the corruption determination and transmittal of the message may occur within the same time slice T6. This is contrasted with current known relaying schemes that perform a determination in one time slice and then transmit the data (if not corrupt) and the transmission message in a second time slice. Such current schemes require two time slices for the transmission of data, as opposed to one for the illustrated embodiment; although, it is understood that the above is merely an illustrative comparison to which the disclosed subject matter is not limited.

Transmission 314 illustrates that, in one embodiment, if the received data was not corrupt a receipt message may be transmitted back to the prior point. The receipt message may indicate whether or not the data was received in a corrupt state. In this embodiment, message 314 would indicate that the data was not corrupt. In various embodiments, such a message may be referred to or include an acknowledgement (ACK) message. In some embodiments, the receipt transmission 314 may occur during the sixth time slice (T6).

The forwarding of data, the determination of the state (corrupt or uncorrupt) of the data, the resulting transmission and receipt messages may occur again and again for each point in the path until the data is received in an uncorrupt state by the BS 202. For example, transmissions 320 and 326 illustrate the forwarding of the data simultaneously to the determination of the state of the data. Transmissions 324 and 330 illustrate transmission messages that, in this embodiment, indicate that the data has been received in an uncorrupt state. Transmissions 322 and 328 illustrate receipt messages that, in this embodiment, indicate that the data has been received in an uncorrupt state. In some embodiments, the BS 202 may also transmit a receipt message to RS 204 (transmission is not illustrated).

Figure 4:
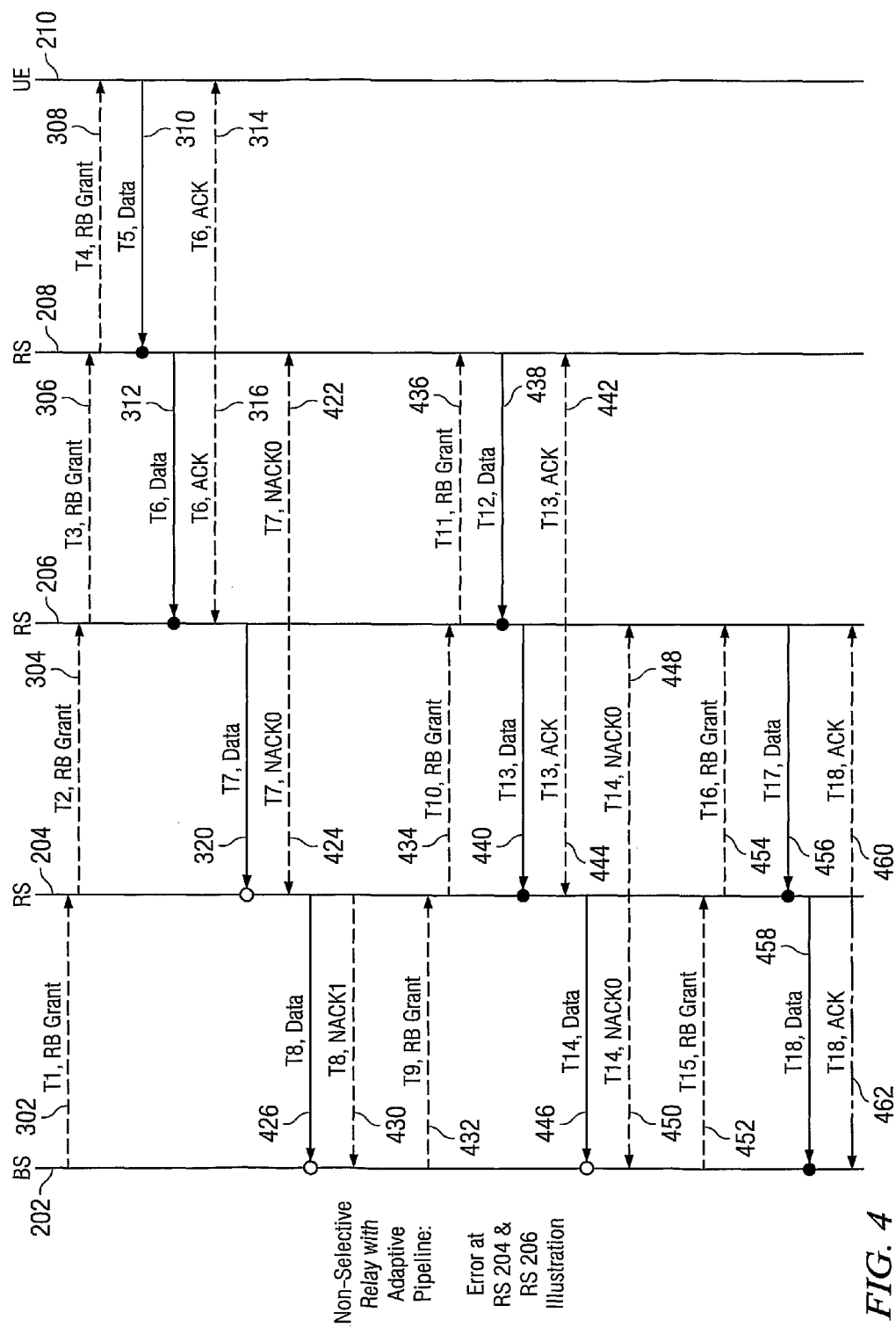
FIG. 4 is a timing diagram illustrating an apparatus and system in accordance with an example embodiment of the disclosed subject matter.

FIG. 4 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 4 illustrates an embodiment of system 200 that includes a non-selective relay of the data with an adaptive pipeline. The illustrated timing diagram shows the case in which errors or data corruption occurs at or are detected by RS 204 and RS 206. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

Transmissions 302, 304, 306, and 308 illustrate the allocation or granting of resource blocks allowing for the transmission of data, as described above. Transmissions 310, 312, 314, 316 illustrate the transmission of data and control messages, as described above.

Transmission 312 illustrates that, in one embodiment, RS 208 may transmit or forward data to the next point (RS 206); however, in this illustrative example the data may become corrupt during the transmission. Upon receipt of the data, RS 206 may substantially simultaneously transmit the data to the next point (RS 204, via transmission 320) and determine if the data is corrupt. In this embodiment, the system 200 or relay station 206 may be acting as a non-selective relay because the data is relayed regardless or whether or not it is corrupt. This may be contrasted with known systems in which only uncorrupt data is forwarded; although, it is understood that the above is merely an illustrative comparison to which the disclosed subject matter is not limited. In various embodiments, the forwarding of the data may consume or use the resource block allocated to RS 206, as described above.

Transmission 424 illustrates that, in this embodiment, since the data was received in a corrupt state the transmission message 424 may indicate the corruption. In one embodiment, this transmission message 424 may include a negative acknowledgment (NACK). Furthermore, this transmission message 424 may include an indication of which point the corruption was first detected. In various embodiments, the indication may be an index or field that counts how many transmission points prior to the current point the corruption was first detected. For example, RS 206 would be zero points prior to the detection of the corruption and the index value may be zero (NACK0). In various embodiments, the transmission message 424 may include an indication of which point the data was last known to be in a non-corrupt state.

Transmission 422 illustrates that, in one embodiment, since the data was received in a corrupt state, RS 206 may request that the prior point re-send the data. However, since the prior point (RS 208) has already consumed or used its resource block (during transmission 312) it may not be able to immediately re-send the data.

In one embodiment, upon receipt of the corrupt data, RS 204 may forward the data (transmission 426) to the BS 202 and use the allocated resource block. However, because the RS 204 also received a transmission message 424 indicating that the data was previously corrupted, the RS 204 may not, in one embodiment, perform a determination of the state of the data using the error detection scheme. Instead the RS 204 may automatically consider the data corrupt (illustrated by the white dot).

In one embodiment, transmission 430 illustrates that the RS 204 may transmit a transmission message 430 indicating that the data is corrupt and at which point the corruption was first detected. In various embodiments, this may include the incrementing of an index (e.g., NACK1). In some embodiments, the RS 204 may forgo transmitting a receipt message to the prior point if the received transmission message 424 indicates that the data was corrupt.

Transmissions 432, 434 and 436 illustrate that, in one embodiment, upon receipt of corrupted data, new resource block allocations may be granted. In some embodiments, the number of resource block allocations may be determined by the transmission message 430 that indicates which point in the path first detected the corruption and therefore needs to re-send the data.

Transmission 438 illustrates that, in one embodiment, upon the re-allocation of a resource block to RS 208, the data may be re-forwarded to the next point (RS 206). Upon the transmission of the data the new resource block may be marked or considered used.

Transmission 440 illustrates that the received data may be forwarded, and a determination made regarding the state of the data. Transmissions 442 and 444 illustrate that, in one embodiment, control messages may be sent to the prior and next points, respectively, indicating that the data was not corrupt.

Transmissions 446, 448, 450, 452, 454, 456, 458, 460, and 462 may illustrate that, in one embodiment, the re-forwarded data may become corrupt, new resource blocks may be allocated as needed, the data re-forwarded again until the data is received in an uncorrupted state by the BS 202, and the various control messages, described above, relating to those transmissions. In various embodiments, the BS 202 may buffer the corrupted data, and overwrite it as new versions of the data are received or combine it with new versions of the data (via transmissions 446 and 458). In another embodiment, the resource block re-allocations (transmissions 432, 434, 436, 452, and 454) may not occur in the next time slice but may instead be scheduled based upon a resource allocation scheme (e.g., an arbitration scheme involving user equipment and relay stations not illustrated in system 200, etc.).

Figure 5:
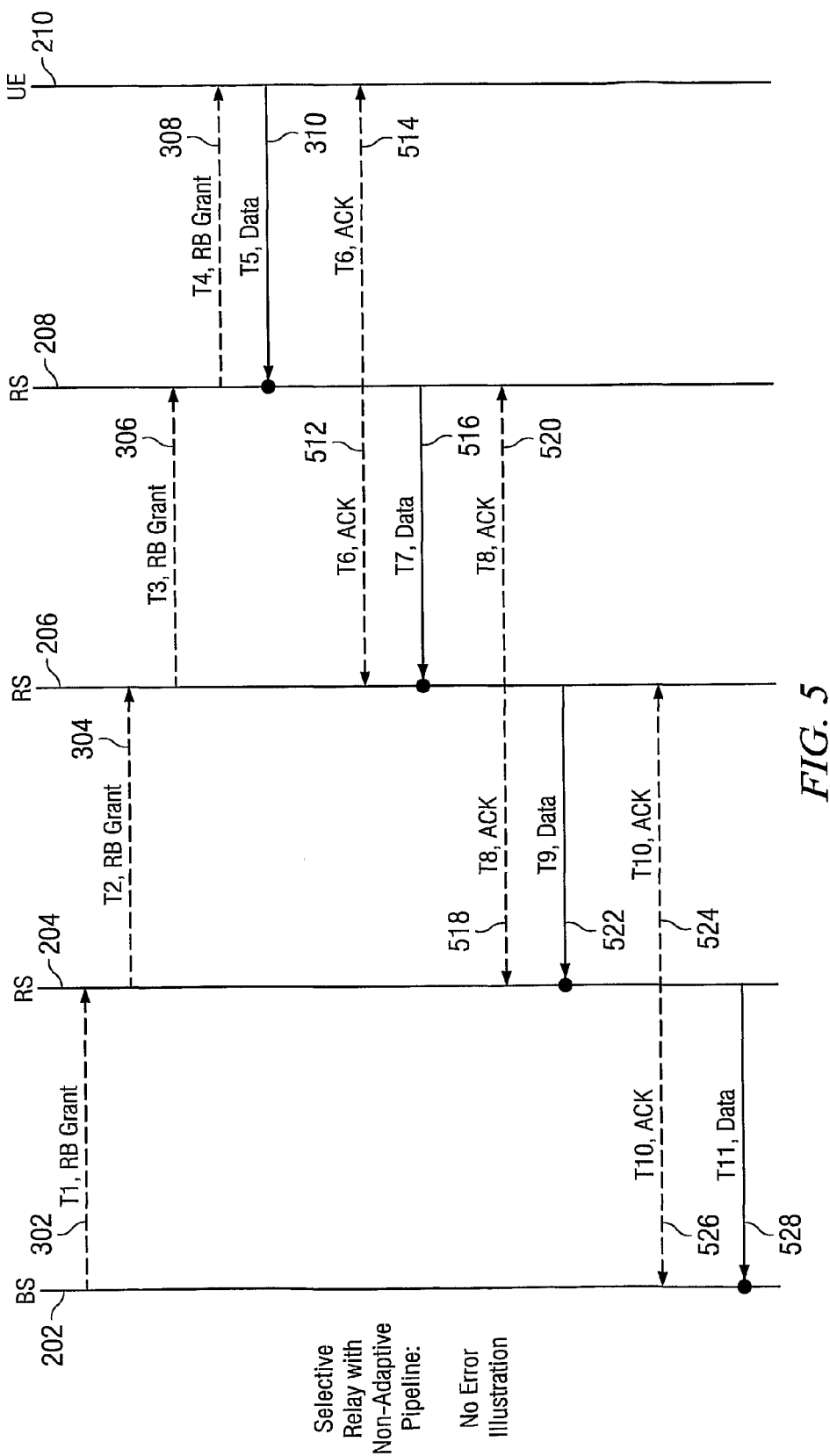
FIG. 5 is a timing diagram illustrating an apparatus and system in accordance with an example embodiment of the disclosed subject matter.

FIG. 5 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 5 illustrates an embodiment of system 200 that includes a selective relay of the data with a non-adaptive pipeline. The illustrated timing diagram shows the case in which no errors or data corruption occurs. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

As explained below in reference to FIGS. 5 and 6, the system in this embodiment may be considered to employ a selective relay in that data is forwarded only if it is not corrupt. The system in this embodiment may be considered to employ a non-adaptive pipeline in that resource blocks are not re-allocated when data becomes corrupted.

Transmissions 302, 304, 306, and 308 illustrate the allocation or granting of resource blocks allowing for the transmission of data, as described above. Transmission 310 illustrates that, in one embodiment, data may be transmitted from the UE 210 to the RS 208. In one embodiment, this data may include error detection information, as described above. After or upon receipt of the data, in one embodiment, RS 208 may determine if the received data is corrupt.

As FIG. 5 illustrates the case in which no error or corruption occurs, RS 208 will determine that the data is not corrupt. Transmission 514 illustrates that, in one embodiment, a receipt message may be transmitted from the current point (RS 208) to the prior point (UE 210) indicating that the received data was not corrupt. Upon receipt of message 514 the prior point may mark, indicate, or consider the resource block allocation to be used. This is contrasted with known relay schemes in which the resource block allocation is considered used when the data is transmitted; although, it is understood that the above is merely an illustrative comparison to which the disclosed subject matter is not limited.

Transmission 512 illustrates that, in one embodiment, a transmission message may be sent to the next point in the transmission path. The transmission message may include an indication of whether or not the data was received in a corrupt state. In one embodiment, the transmission message 512 and, in another embodiment, receipt message 514 may include an acknowledgment (ACK) message if the data was not corrupt. In various embodiments, the messages 512 and 514 may occur one time slice (T6) after the receipt of the data.

Transmission 516 illustrates that, in one embodiment, if the data is not corrupt the relay station 208 may forward the data to the next point in the transmission path. In various embodiments, the transmission 516 may occur one time slice (T7) after the determination of the state of the received data.

Transmission 520 illustrates that, in one embodiment, a receipt message may be sent from the next point (RS 206) back to the RS 208. In the illustrated embodiment, transmission 520 may indicate that the data was received in an uncorrupt state by the next point. RS 208 may then, mark, indicate or otherwise consider the allocated resource block to be used.

Transmissions 518, 522, 524, 526, and 528 illustrate the transmittal of the data and the associated control messages to the base station 202. In the illustrated embodiment, no data corruption occurs. In one embodiment, when the BS 202 receives the control message 526 indicating no data corruption in prior point, the BS 202 may release the associated resource blocks for other usage. In various embodiments, the BS 202 may issue or send a receipt message to RS 204 indicating whether or not the received data was corrupt (the transmission is not illustrated).

Figure 6:
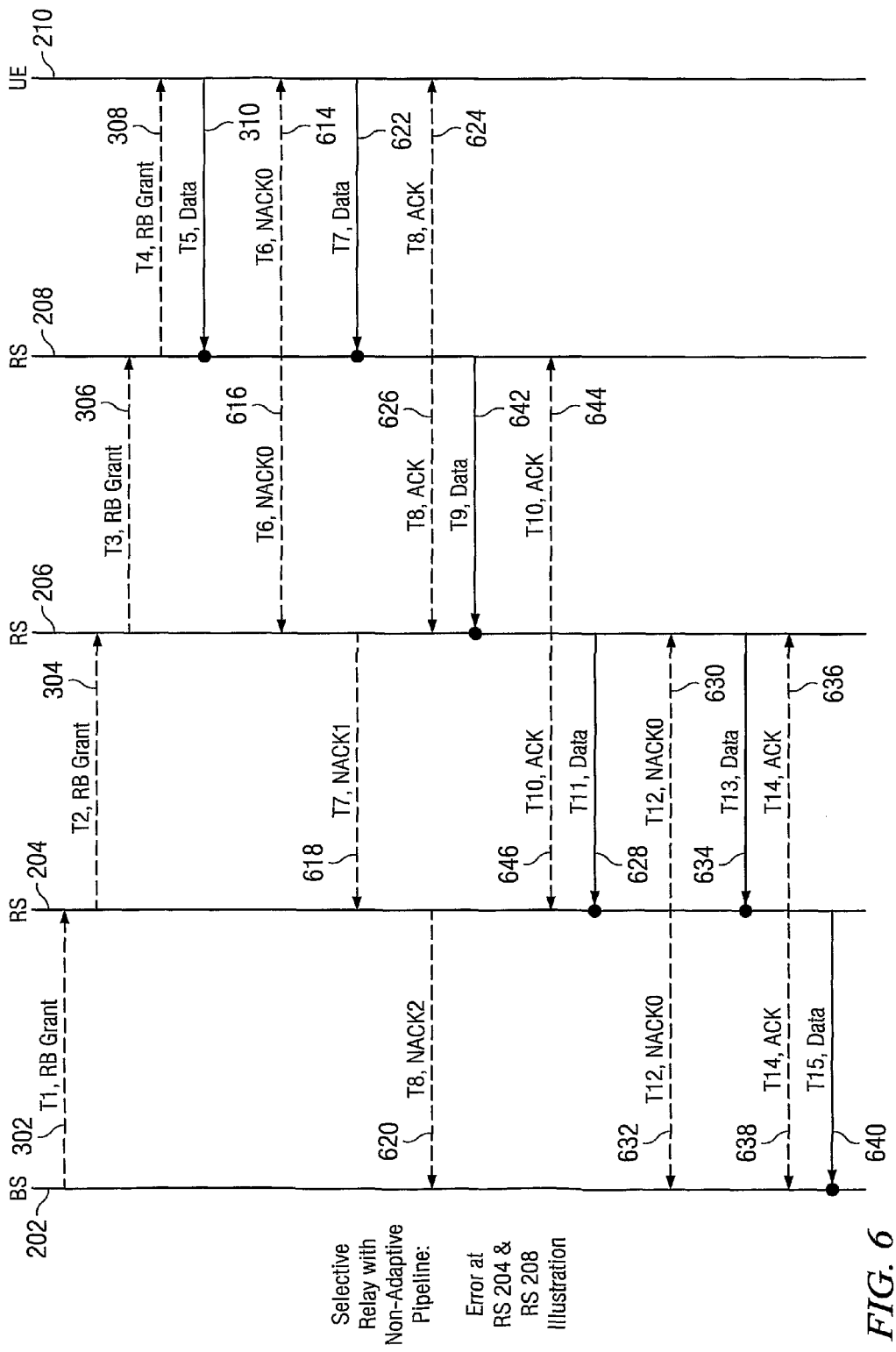
FIG. 6 is a timing diagram illustrating an apparatus and system in accordance with an example embodiment of the disclosed subject matter.

FIG. 6 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 6 illustrates an embodiment of system 200 that includes a selective relay of the data with a non-adaptive pipeline. The illustrated timing diagram shows the case in which errors or data corruption occur or are detected at RS 204 and RS 208. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

Transmissions 302, 304, 306, and 308 illustrate the allocation or granting of resource blocks allowing for the transmission of data, as described above. Transmission 310 illustrates that, in one embodiment, data may be transmitted from the UE 210 to the RS 208. In one embodiment, this data may include error detection information, as described above. After or upon receipt of the data, in one embodiment, RS 208 may determine if the received data is corrupt.

Transmission 614 illustrates that, in one embodiment, if the received data is corrupt, the relay station 208 may request that the data be re-transmitted from the prior point (UE 210). In various embodiments, the receipt message 614 may indicate that the received data was corrupt. In another embodiment, the receipt message 614 may include a negative acknowledgement (NACK) message. Transmission 616 illustrates that, in one embodiment, a transmission message may be sent to the next point in the path indicating whether or not the received data was corrupt. In this embodiment, the transmission message 616 may include a negative acknowledgement (NACK) message. In various embodiments, the transmission message 616 may include an indication of which point the data corruption was first detected. As described above, the transmission message may include an index that is incremented as the transmission message (or its derivatives) traverses the transmission path (e.g., NACK0).

Transmission 618 may include a transmission message that indicates that the data corruption was first detected one point prior (e.g., NACK1). Transmission 620 may include a transmission message that indicates that the data corruption was first detected two points prior (e.g., NACK2). In various embodiments, if the data is corrupt, the transmission point (RS 208) may prevent or refrain from forwarding the corrupt data. Therefore, the subsequent transmission points (RS 206 and RS 204) may not forward the data either. In various embodiments, the system 200 or RS 208 may be said to selectively relay data. In one embodiment, the current and subsequent transmission points may not use their allocated resource blocks. This is contrasted with known relaying schemes in which the allocated resource blocks are considered used even if only the transmission message (e.g., transmissions 616, 618, and 620) are sent; although, it is understood that the above is merely an illustrative comparison to which the disclosed subject matter is not limited.

Transmission 622 illustrates that, in one embodiment, the prior transmission point (UE 210) may re-transmit the data without waiting for a new resource block allocation. In various embodiments, because the resource block allocation was not marked or considered used until a positive receipt message was received from the RS 208, the UE 210 may be considered to still be allocated a useable resource block. Also, in one embodiment, the data transmission 622 may occur substantially simultaneously with the transmission message 618 (time slice seven, T7). In various embodiments, the reuse of the resource block allocation may allow for the parallel processing of data and control messages within the system 200.

Transmission 624 illustrates that, in one embodiment, RS 208 may send a receipt message to the prior point (UE 210) indicating that the received data is not corrupt. Upon receipt of the receipt message 624 the UE 210 may mark, indicate or consider the resource block allocation (received in transmission 308) to be used.

Transmission 626 may illustrate that, in one embodiment, a transmission message may be sent to the next point indicating that the data was not corrupt. Transmission 642 illustrates, that the non-corrupt data may be forwarded to the next point.

Transmission 644 illustrates that, in one embodiment, a receipt message may be received from the next point (RS 206) indicating that the data was not corrupt. At which time, the RS 208 may mark, indicate, or consider the resource block allocation (from transmission 306) to be used.

Transmission 646 illustrates that, in one embodiment, a transmission message may be sent to RS 204.

Transmissions 628, 630, and 632 illustrate that, in one embodiment, data may be corrupted when transmitted between RS 206 and RS 204. In various embodiments, the transmission message 632 may include an indication of which point the data corruption was first detected. As described above, the transmission message may include an index that is incremented as the transmission message (or its derivatives) traverses the transmission path (e.g., NACK0). In one embodiment, when the BS 202 receives the control message 632 indicating the data corruption was first detected zero points prior to RS 204 (e.g., NACK0), the BS 202 may release the resource blocks of previous points (e.g., UE 210 and RS 208) and still reserve the resource blocks of RS 206 and RS 204.

Transmissions 634, 636, 638, and 640 illustrate that, in one embodiment, the data may be retransmitted without waiting for the new resource allocation and the overall transmission completed, as described above.

Figure 7:
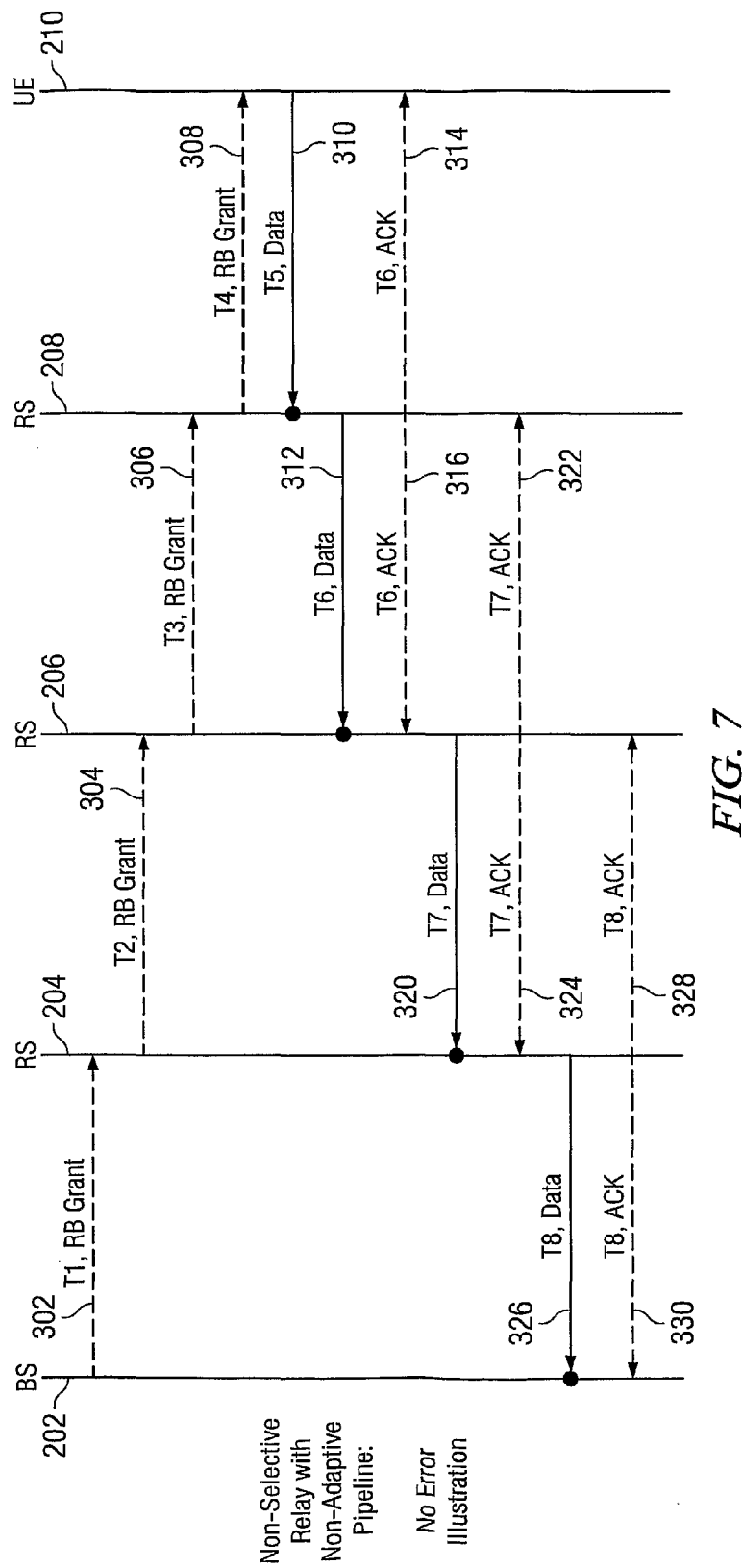
FIG. 7 is a timing diagram illustrating an apparatus and system in accordance with an example embodiment of the disclosed subject matter.

FIG. 7 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 7 illustrates an embodiment of system 200 that includes a non-selective relay of the data with a non-adaptive pipeline. The illustrated timing diagram shows the case in which no errors or data corruption occurs. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

As explained below in reference to FIGS. 7 and 8, the system in this embodiment may be considered to employ a non-selective relay in that data is forwarded regardless or whether or not it is corrupt. The system in this embodiment may be considered to employ a non-adaptive pipeline in that resource blocks are not re-allocated when data becomes corrupted. As such, FIGS. 7 & 8 may describe embodiments that combine features of both the systems illustrated by FIGS. 3 & 4 and 5 & 6.

In this embodiment in which no errors occur, the transmissions illustrated by FIG. 7 may be identical to those described above in reference to FIG. 3.

Figure 8:
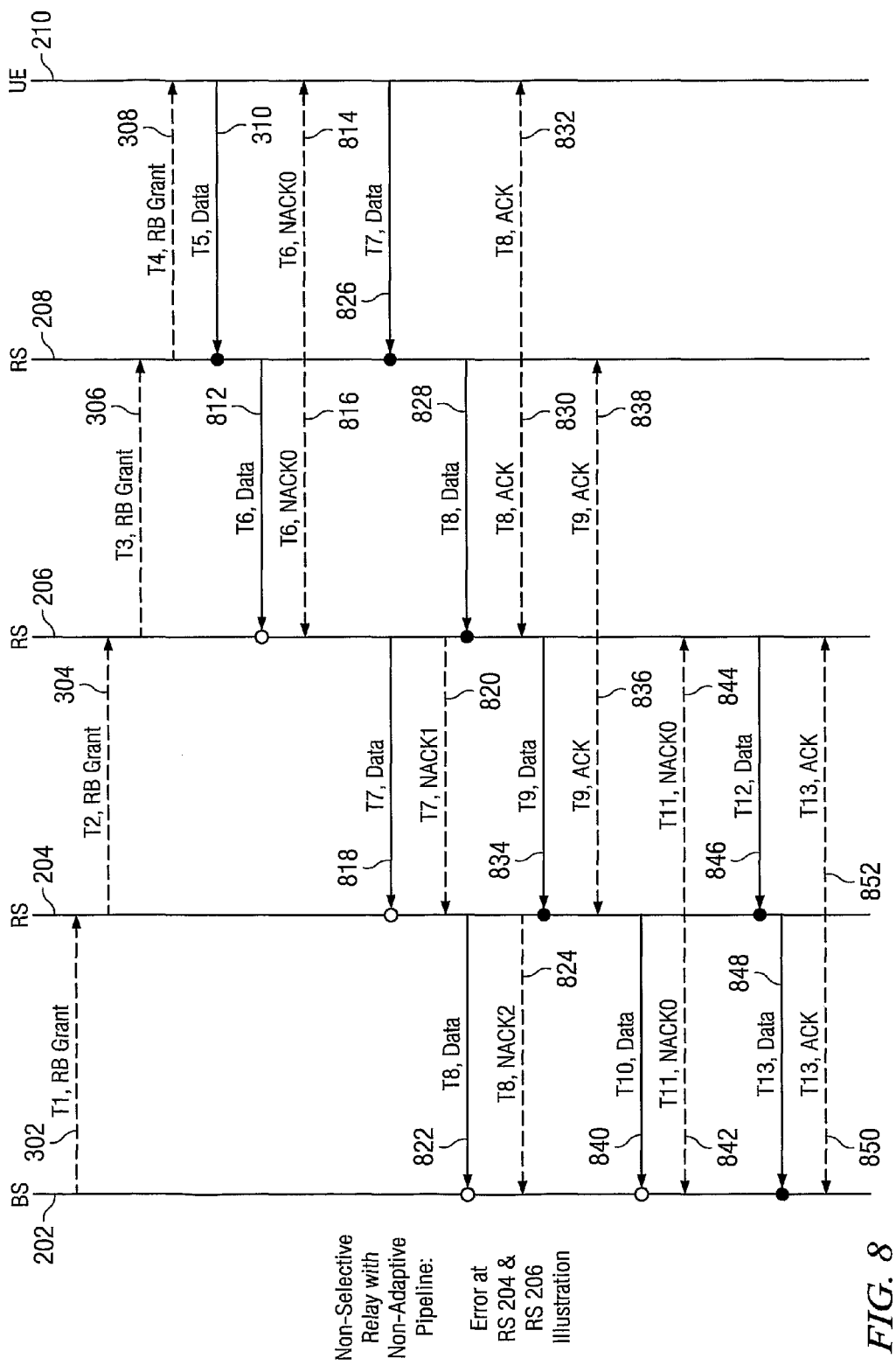
FIG. 8 is a timing diagram illustrating an apparatus and system in accordance with an example embodiment of the disclosed subject matter.

FIG. 8 is a timing diagram illustrating an apparatus and system in accordance with an example embodiment of the disclosed subject matter. In one embodiment, the system may include a base station 202, a number of relay stations (e.g., relay stations 204, 206 and 208) and user equipment 210. FIG. 8 illustrates an embodiment of system 200 that includes a non-selective relay of the data with a non-adaptive pipeline. The illustrated timing diagram shows the case in which errors or data corruption occurs at RS 204 and RS 206. The arrows illustrate transmissions (either control or data transmissions) that occur during a particular time slice after a time slice zero (T0). While the timing diagram illustrates a relatively synchronous operation, asynchronous embodiments are contemplated and within the scope of the disclosed subject matter. Also, while the timing diagram illustrates data transmission from the UE 210 to the BS 202, the converse is contemplated and within the scope of the disclosed subject matter.

Transmissions 302, 304, 306, and 308 illustrate the allocation or granting of resource blocks allowing for the transmission of data, as described above. Transmission 310 illustrates that, in one embodiment, data may be transmitted from the UE 210 to the RS 208. In one embodiment, this data may include error detection information, as described above.

As described above in reference to FIG. 4, upon receipt of the data, the RS 208 may substantially simultaneously forward the data (transmission 812) and determining whether or not the data is corrupt. However, in one embodiment, until transmission 312 of FIG. 4, the resource allocation block may not be marked, indicated as or considered used until a receipt message is received that indicates that the data was transmitted in an uncorrupt state to the next point (RS 206). The timing of the usage of the resource block allocation may occur more similarly to that described in reference to transmission 642 of FIG. 6. Transmissions 814 and 816 may indicate that the received data was corrupt, as described above.

As described above, transmissions 818, 820, 822, and 824 illustrate that, in one embodiment, the corrupt data may be forwarded to the BS 202 along with a transmission message indicating the state of the data (corrupt) and at which transmission point (RS 208) the corruption was first detected. Upon receipt of the negative acknowledgement (NACK) message 814 the UE 210 may not mark, indicate or consider the resource block allocation (from transmission 308) to be used. As the resource block is still unused and available, the UE 210 may re-transmit the data to RS 208 via transmission 826. Furthermore, this re-transmittal 826 may occur during the same time slice (T7) as transmissions 818 and 820.

Transmissions 828, 830, and 832 illustrate that the RS 208 may substantially simultaneously forward the data to the next point and determine whether or not the received data is corrupt. UE 210 may, in one embodiment, mark, indicate or consider the resource block allocation (from transmission 308) to be used when the receipt message 832 indicates that the data was received in a non-corrupt state.

Transmissions 834, 836, 838, 840, 842, 844, 846, 848, 850, and 852 illustrate the transmittal of the data, transmission messages, and receipt messages as the data is forwarded from RS 206 to the BS 202, with an error or data corruption occurring during the first transmittal to RS 204. In one embodiment, the transmissions may occur similarly to those described above.

Figure 9A:
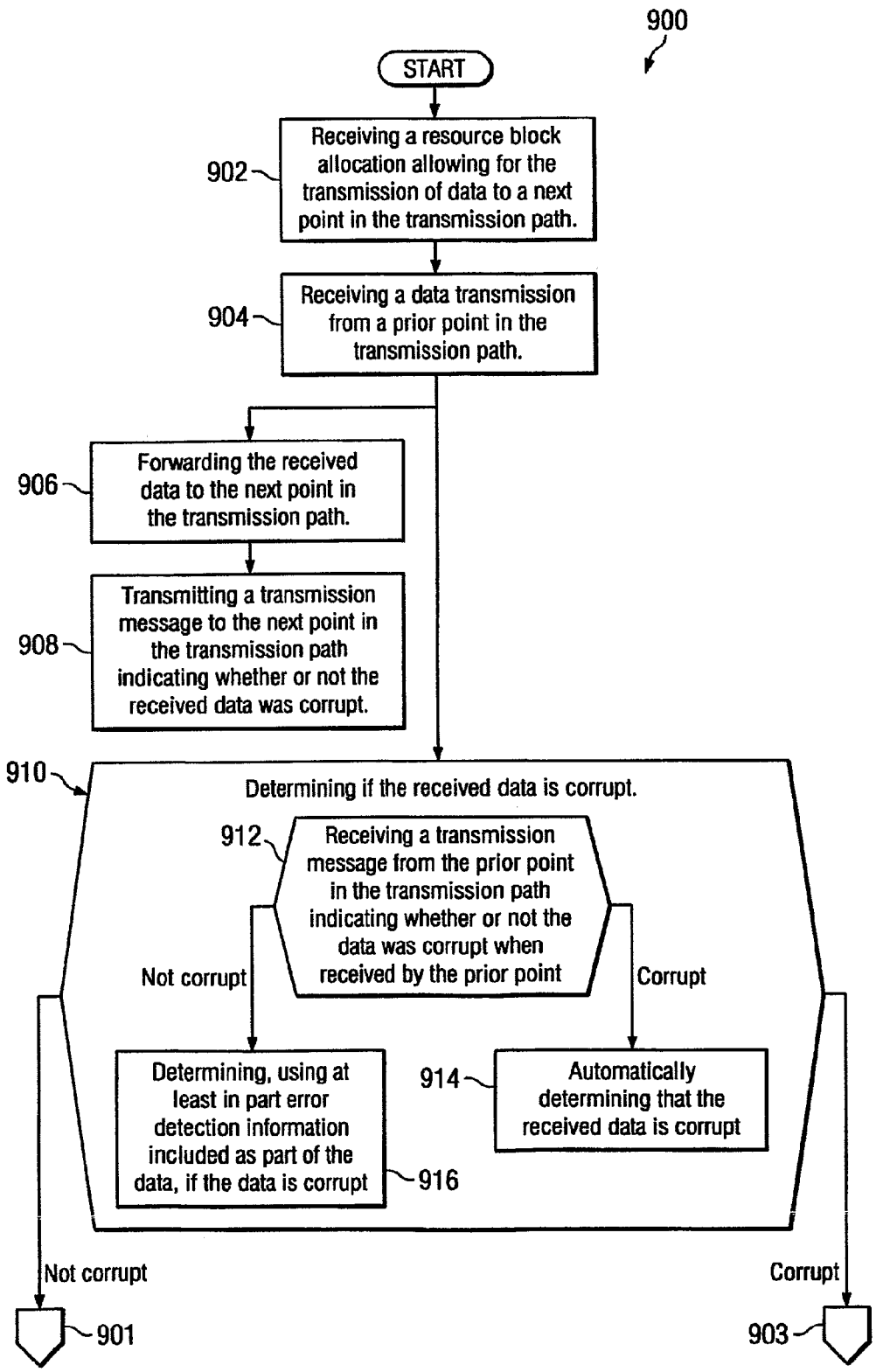
FIG. 9 is a flow chart illustrating a technique in accordance with an example embodiment of the disclosed subject matter.
Figure 9B:
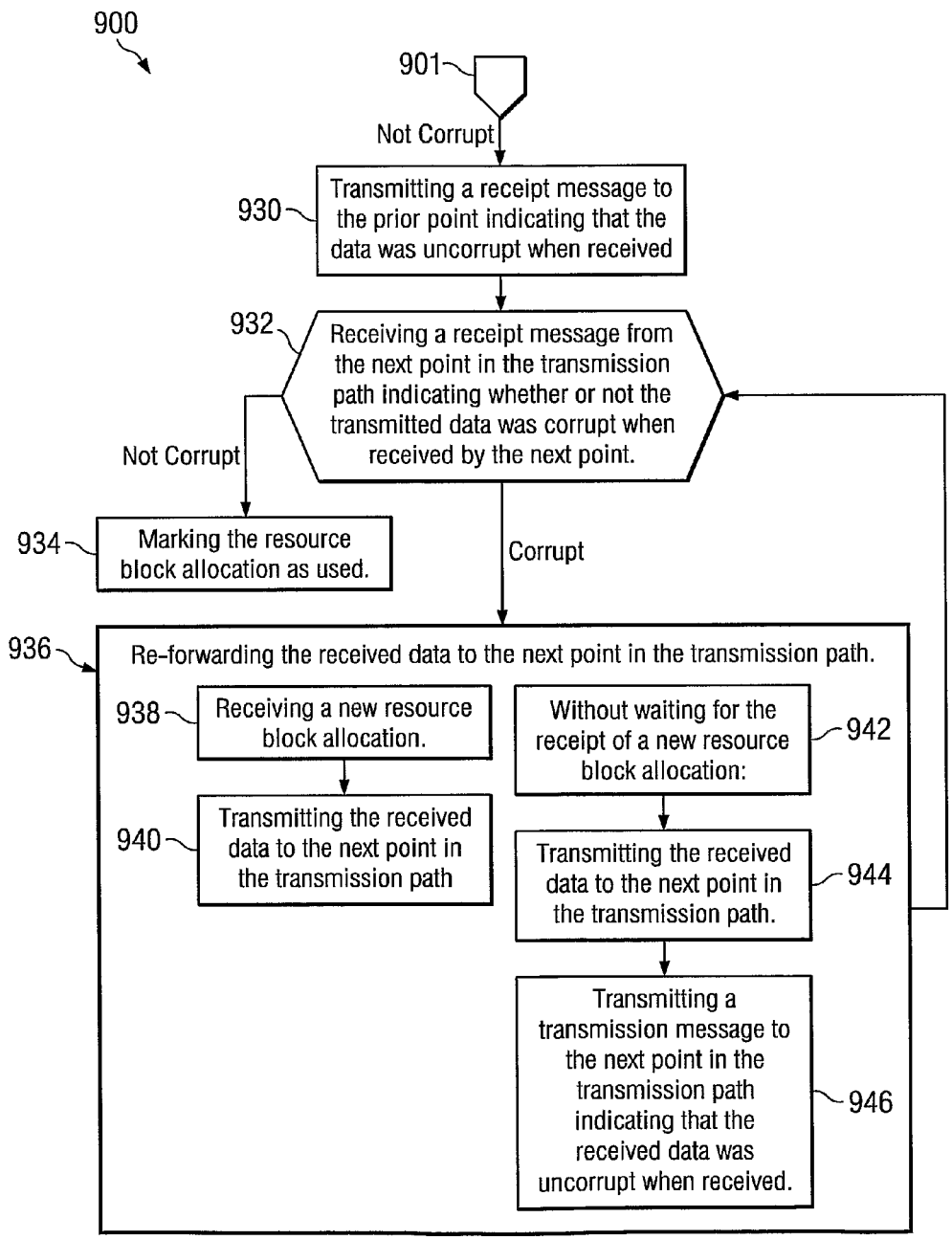
Figure 9C:
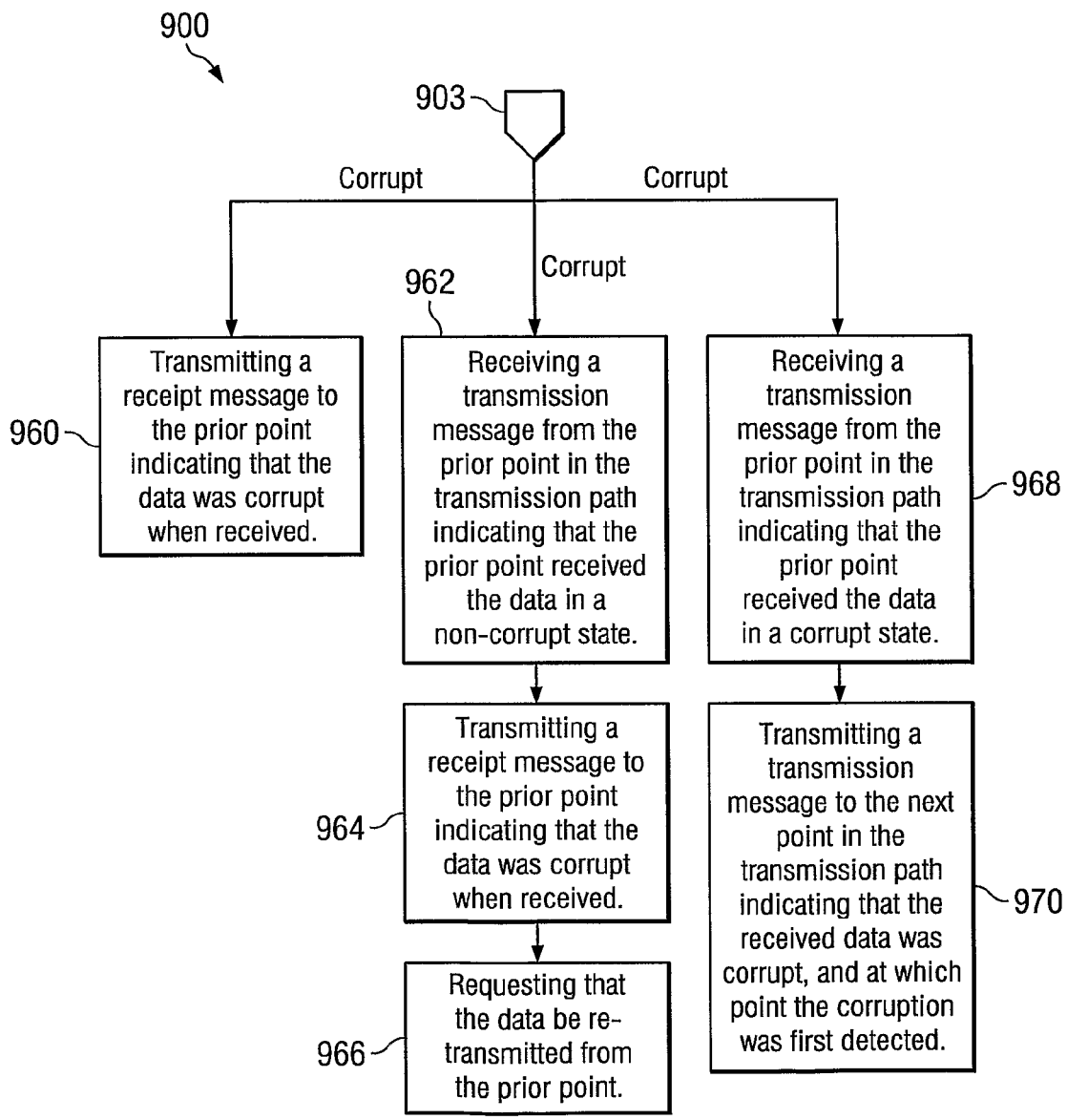

FIG. 9 is a flow chart illustrating a technique 900 in accordance with an example embodiment of the disclosed subject matter. It is understood that FIGS. 9a, 9b and 9c represent a single flowchart illustrated on three pages. The connectors 901 and 903 provide a way to represent the connection between the pages. Hereafter and here-before, the flowchart of the technique 900 is simply referred to as FIG. 9, as if the flowchart merely occupied a single page.

In various embodiments, parts or all of the technique 900 may be used to produce a system or apparatus confirming to the timing diagrams of FIGS. 3 & 4 and/or 7 & 8. Although, it is understood that other systems and timing diagrams may result from the use of technique 900.

Block 902 illustrates that, in one embodiment, a resource block allocation allowing for the transmission of data to a next point in the transmission path may be received. In various embodiments, a relay station such as relay station 208 of FIG. 2 may receive the allocation, as described above.

Block 904 illustrates that, in one embodiment, a data transmission from a prior point in the transmission path may be received. In various embodiments, a relay station such as relay station 208 of FIG. 2 may receive the data, as described above.

Block 906 illustrates that, in one embodiment, the received data may be forwarded to the next point in the transmission path. In various embodiments, a relay station such as relay station 208 of FIG. 2 may forward the data, as described above.

Block 908 illustrates that, in one embodiment, a transmission message may be transmitted to the next point in the transmission path indicating whether or not the received data was corrupt. In various embodiments, a relay station such as relay station 208 of FIG. 2 may transmit the message, as described above.

Block 910 illustrates that, in one embodiment, substantially simultaneously to forwarding the data a determination may be made as to if the received data is corrupt. In various embodiments, a relay station such as relay station 208 of FIG. 2 may make the determination, as described above.

Block 912 illustrates that, in one embodiment, making the determination may include receiving a transmission message from the prior point in the transmission path indicating whether or not the data was corrupt when received by the prior point. In various embodiments, a relay station such as relay station 208 of FIG. 2 may make the determination, as described above.

Block 914 illustrates that, in one embodiment, if the transmission message indicates that data was corrupt automatically determining that the received data is corrupt. In various embodiments, a relay station such as relay station 208 of FIG. 2 may perform the operation, as described above.

Block 916 illustrates that, in one embodiment, if the transmission message indicates that data was not corrupt determining, using at least in part error detection information included as part of the data, if the data is corrupt. In various embodiments, a relay station such as relay station 208 of FIG. 2 may perform the operation, as described above.

Block 930 illustrates that, in one embodiment, if the received data is not corrupt, a receipt message may be transmitted to the prior point. Wherein the receipt message may indicate, in one embodiment, that the data was uncorrupt when received. In various embodiments, a relay station such as relay station 208 of FIG. 2 may perform the operation, as described above.

Block 932 illustrates that, in one embodiment, if the received data is not corrupt, a receipt message may be received from the next point in the transmission path indicating whether or not the transmitted data was corrupt when received by the next point. In various embodiments, a relay station such as relay station 208 of FIG. 2 may perform the operation, as described above.

Block 934 illustrates that, in one embodiment, if the transmitted data was not corrupt, the resource block allocation may be marked, indicated, or considered as used. In various embodiments, a relay station such as relay station 208 of FIG. 2 may perform the operation, as described above.

Block 936 illustrates that, in one embodiment, if the transmitted data was corrupt, the received data may be re-forwarding to the next point in the transmission path. In various embodiments, a relay station such as relay station 208 of FIG. 2 may perform the operation, as described above.

Block 938 illustrates that, in one embodiment, re-forwarding the data may include receiving a new resource block allocation. Block 940 illustrates that, in one embodiment, re-forwarding the data may include transmitting the received data to the next point in the transmission path. In various embodiments, a relay station such as relay station 208 of FIG. 2 may perform the operation, as described above.

Block 942 illustrates that, in one embodiment, re-forwarding the data may include performing Blocks 944 and 946 without waiting for the receipt of a new resource block allocation. Block 944 illustrates that, in one embodiment, re-forwarding the data may include transmitting the received data to the next point in the transmission path. Block 946 illustrates that, in one embodiment, re-forwarding the data may include transmitting a transmission message to the next point in the transmission path indicating that the received data was uncorrupt when received. In various embodiments, a relay station such as relay station 208 of FIG. 2 may perform the operation, as described above.

Block 960 illustrates that, in one embodiment, if the received data is corrupt, a receipt message may be transmitted to the prior point indicating that the data was corrupt when received. In various embodiments, a relay station such as relay station 208 of FIG. 2 may perform the operation, as described above.

Block 962 illustrates that, in one embodiment, if the received data is corrupt, a transmission message from the prior point in the transmission path may be received indicating that the prior point received the data in an non-corrupt state. Block 964 illustrates that, in one embodiment, if the received data is corrupt, a receipt message may be transmitted to the prior point indicating that the data was corrupt when received. Block 966 illustrates that, in one embodiment, if the received data is corrupt, a request may be made that the data be re-transmitted form the prior point. In various embodiments, a relay station such as relay station 208 of FIG. 2 may perform the operations, as described above.

Block 968 illustrates that, in one embodiment, if the received data is corrupt, a transmission message may be received from the prior point in the transmission path indicating that the prior point received the data in a corrupt state. Block 970 illustrates that, in one embodiment, if the received data is corrupt, a transmission message may be sent to the next point in the transmission path indicating that the received data was corrupt, and at which point the corruption was first detected. In various embodiments, a relay station such as relay station 208 of FIG. 2 may perform the operations, as described above.

Figure 10A:
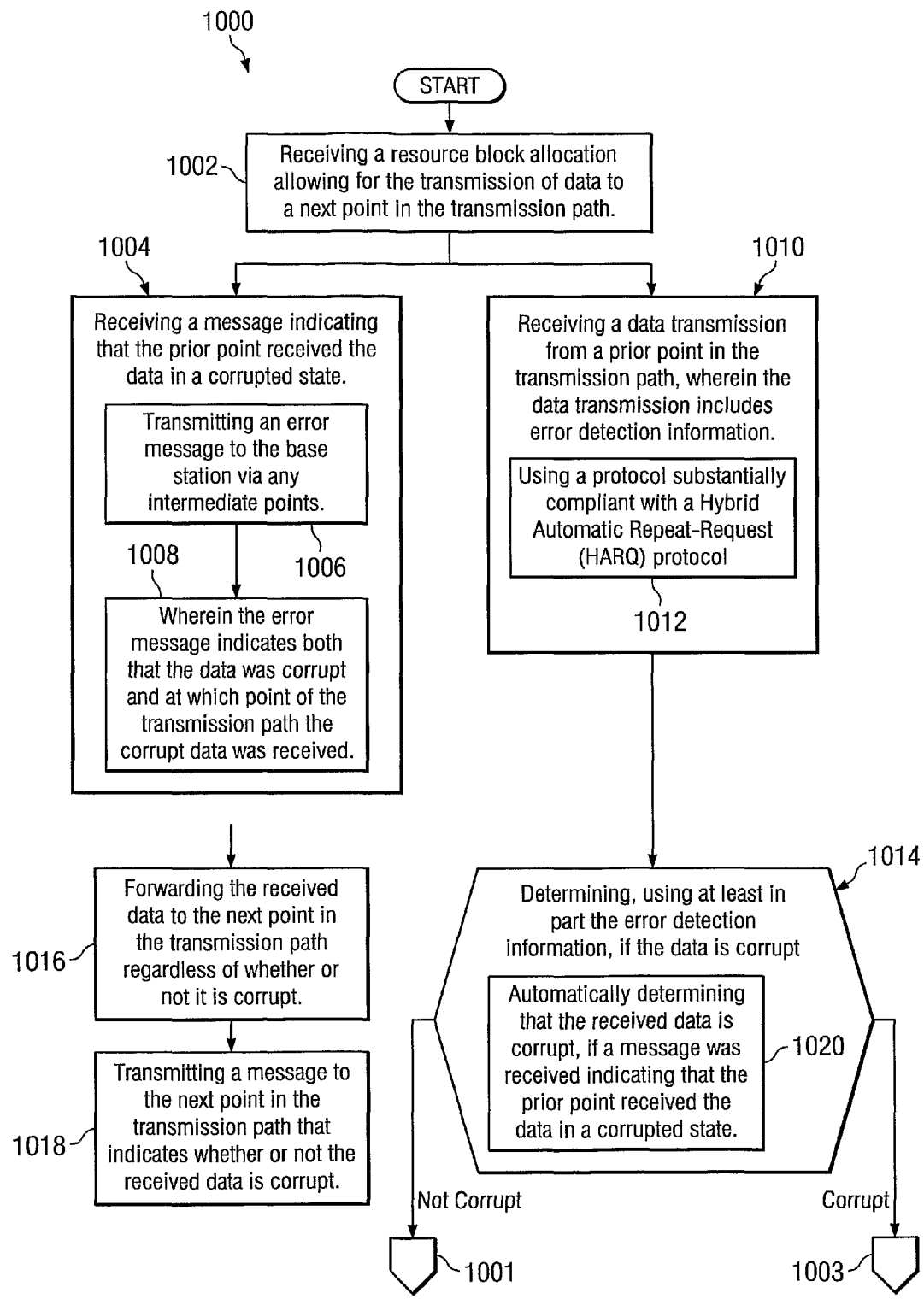
FIG. 10 is a flow chart illustrating a technique in accordance with an example embodiment of the disclosed subject matter.
Figure 10B:
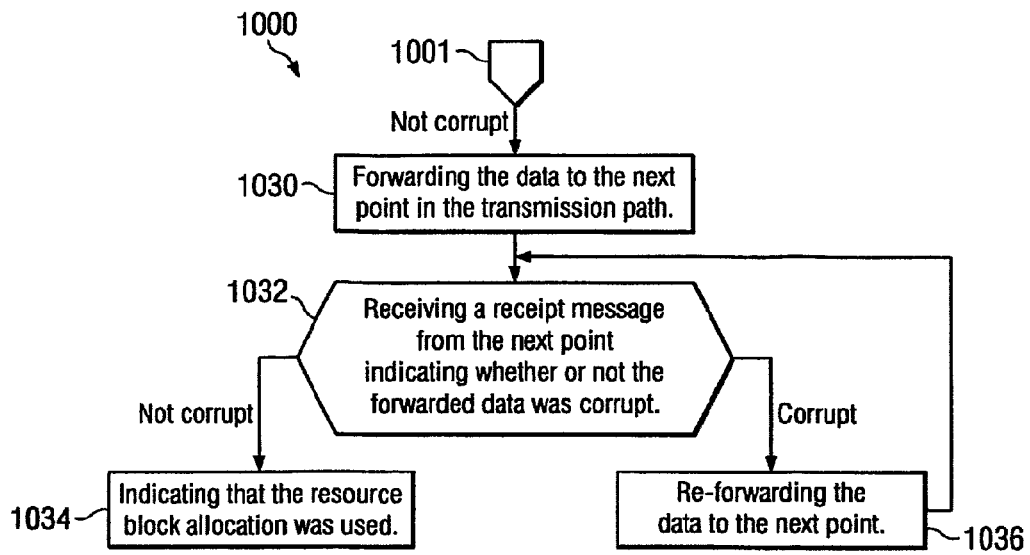
Figure 10C:
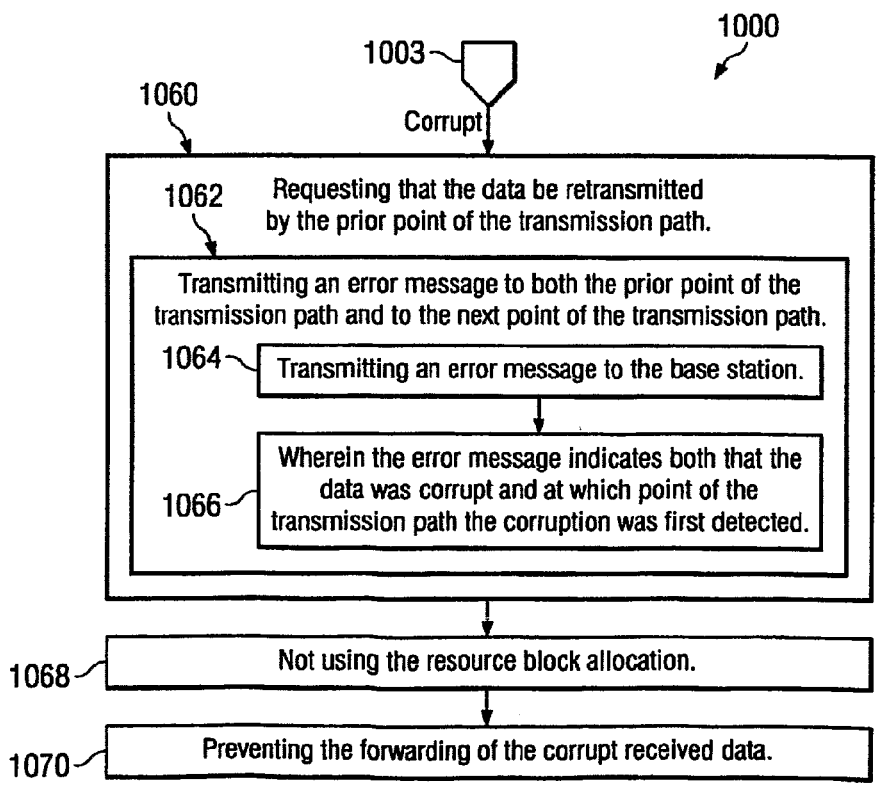

FIG. 10 is a flow chart illustrating a technique 1000 in accordance with an example embodiment of the disclosed subject matter. It is understood that FIGS. 10*a*, 10*b* and 10*c* represent a single flowchart illustrated on three pages. The connectors 1001 and 1003 provide a way to represent the connection between the pages. Hereafter and here-before, the flowchart of the technique 1000 is simply referred to as FIG. 10, as if the flowchart merely occupied a single page.

In various embodiments, parts or all of the technique 1000 may be used to produce a system or apparatus confirming to the timing diagrams of FIGS. 5 & 6 and/or 7 & 8. Although, it is understood that other systems and timing diagrams my result from the use of technique 1000.

Block 1002 illustrates that, in one embodiment, a resource block allocation allowing for the transmission of data to a next point in the transmission path may be received. In various embodiments, a relay station such as relay station 208 of FIG. 2 may perform the operations, as described above.

Block 1004 illustrates that, in one embodiment, a message indicating that the prior point received the data in a corrupted state may be received. Block 1006 illustrates that, in one embodiment, receiving the transmission message of Block 1004 may include transmitting an error message to the base station via any intermediate points. In other embodiments, Block 1006 may be a independent operation. Block 1008 illustrates that, in one embodiment, the error message may indicate both that the data was corrupt and at which point of the transmission path the corrupt data was received. In various embodiments, a relay station such as relay station 208 of FIG. 2 may perform the operations, as described above.

Block 1010 illustrates that, in one embodiment, a data transmission may be received from a prior point in the transmission path, wherein the data transmission includes error detection information. Block 1012 illustrates that, in one embodiment, the data may be received using a protocol substantially complaint with a Hybrid Automatic Repeat-Request (HARQ) protocol, as described above. In various embodiments, a relay station such as relay station 208 of FIG. 2 may perform the operations, as described above.

Block 1016 illustrates that, in one embodiment, the received data may be forwarded to the next point in the transmission path regardless or whether or not it is corrupt. In various embodiments, Block 1016 may include Block 1030. In various embodiments, Block 1016 may occur substantially simultaneously with Block 1014. In various embodiments, a relay station such as relay station 208 of FIG. 2 may perform the operations, as described above.

Block 1018 illustrates that, in one embodiment, a message may be transmitted to the next point in the transmission path that indicates whether or not the received data is corrupt. In various embodiments, Block 1030 may include Block 1018. In various embodiments, Block 1018 may include Block 1064. In various embodiments, a relay station such as relay station 208 of FIG. 2 may perform the operations, as described above.

Block 1014 illustrates that, in one embodiment, a determination may be made, using at least in part the error detection information, if the data is corrupt. Block 1020 illustrates that, in one embodiment, the determination may include automatically determining that the received data is corrupt, if a message was received indicating that the prior point received the data in a corrupted state. In various embodiments, a relay station such as relay station 208 of FIG. 2 may perform the operations, as described above.

Block 1030 illustrates that, in one embodiment, if the received data is not corrupt, the data may be forwarded to the next point in the transmission path. In various embodiments, Block 1016 may include Block 1030. In various embodiments, Block 1030 may include Block 1018. In various embodiments, a relay station such as relay station 208 of FIG. 2 may perform the operations, as described above.

Block 1032 illustrates that, in one embodiment, if the received data is not corrupt, a receipt message may be received from the next point indicating whether or not the forwarded data was corrupt.

Block 1034 illustrates that, in one embodiment, if the forwarded data was not corrupt, that the resource block allocation may be considered as used. Block 1036 illustrates that, in one embodiment, if the forwarded data was corrupt the data may be re-forwarded to the next point. In various embodiments, a relay station such as relay station 208 of FIG. 2 may perform the operations, as described above.

Block 1060 illustrates that, in one embodiment, if the received data is corrupt, a request may be made that the data be retransmitted by the prior point of the transmission path. Block 1062 illustrates that, in one embodiment, the request may include transmitting an error message to both the prior point of the transmission path and to the next point of the transmission path. Block 1064 illustrates that, in one embodiment, transmitting an error message may include transmitting an error message to the base station. In various embodiments, Block 1018 may include Block 1064. Block 1066 illustrates that, in one embodiment, the error message may indicate both that the data was corrupt and at which point of the transmission path the corruption was first detected. In various embodiments, a relay station such as relay station 208 of FIG. 2 may perform the operations, as described above.

Block 1068 illustrates that, in one embodiment, if the received data is corrupt, the resource block allocation may be considered unused. Block 1070 illustrates that, in one embodiment, if the received data is corrupt, the forwarding of the corrupt received data may be prevented or otherwise not occur. In various embodiments, a relay station such as relay station 208 of FIG. 2 may perform the operations, as described above.

Figure 11:
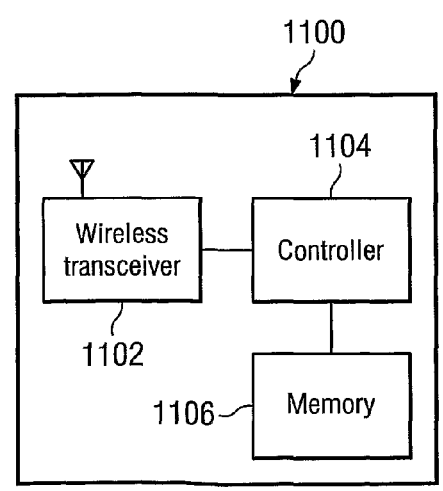
FIG. 11 is a block diagram of a wireless node in accordance with an example embodiment of the disclosed subject matter.

FIG. 11 is a block diagram of a wireless node according to an example embodiment. The wireless node 1100 may include a wireless transceiver 1102, and a controller 1104, and a memory 1106. For example, some operations illustrated and/or described herein, may be performed by a controller 1104, under control of software or firmware.

In addition, a storage medium may be provided that includes stored instructions, which when executed by a controller or processor may result in a controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving a data transmission from a prior point in a transmission path;
   determining if the received data is corrupt;
   forwarding the received data to the next point in the transmission path;
   transmitting a transmission message to the next point in the transmission path indicating whether or not the received data was corrupt; and
   if the data is not corrupt, transmitting a receipt message to the prior point indicating that the data was uncorrupt when received;
   wherein the wireless transmission path includes a user equipment, a base station, and at least one relay station as an intermediate point,
   the method further including:
   prior to receiving the data transmission, receiving, from the base station, a resource block allocation allowing for the transmission of data to a next point in the transmission path;
   if the received data was not corrupt, receiving a receipt message from the next point in the transmission path indicating whether or not the transmitted data was corrupt when received by the next point;
   if the transmitted data was corrupt, re-forwarding the received data to the next point in the transmission path; and
   if the transmitted data was not corrupt, marking the resource block allocation as used.

2. The method of claim 1 wherein forwarding the received data includes forwarding the received data to the next point in the transmission path, before it has been fully determined whether or not the received data is corrupt.

3. The method of claim 1 wherein re-forwarding the received data includes:
   receiving a new resource block allocation; and
   transmitting the received data to the next point in the transmission path.

4. The method of claim 1 wherein re-forwarding the received data includes,
   without waiting for the receipt of a new resource block allocation:
     transmitting the received data to the next point in the transmission path; and
     transmitting a transmission message to the next point in the transmission path indicating that the received data was uncorrupt when received.

5. The method of claim 1 wherein determining if the received data is corrupt includes:
   receiving a transmission message from the prior point in the transmission path indicating whether or not the data was corrupt when received by the prior point;
   if the data was corrupt, automatically determining that the received data is corrupt; and
   if the data was not corrupt, determining, using at least in part error detection information included as part of the data, if the data is corrupt.

6. The method of claim 1 further including:
   if the received data was corrupt and no transmission message from the prior point in the transmission path was received, transmitting a receipt message to the prior point indicating that the data was corrupt.

7. The method of claim 1 further including:
   receiving a transmission message from the prior point in the transmission path indicating that the prior point received the data in an non-corrupt state; and
   if the received data was corrupt, transmitting a receipt message to the prior point indicating that the data was corrupt and requesting that the data be re-transmitted from the prior point.

8. An apparatus comprising:
   a transceiver configured to receive a data transmission from a prior point in a transmission path, wherein the transmission path includes a user equipment, a base station, and at least one apparatus as an intermediate point;
   a controller configured to:
     determine if the received data is corrupt; and
   the transceiver further configured to:
     forward the received data to the next point in the transmission path, and
     transmit a transmission message to the next point in the transmission path, wherein the transmission message indicates whether or not the received data was corrupt, and
     if the data is not corrupt, to transmit a receipt message to the prior point, wherein the receipt message indicates that the data was uncorrupt when received,
   wherein the transceiver is further adapted to:
   prior to receiving the data transmission, receive, from the base station, a resource block allocation allowing for the transmission of data to a next point in the transmission path;
   if the received data was not corrupt, receive a receipt message from the next point in the transmission path, wherein the receipt message indicates whether or not the transmitted data was corrupt when received by the next point;
   if the transmitted data was corrupt, re-forward the received data to the next point in the transmission path; and
   if the transmitted data was not corrupt, indicate that the resource block allocation as used.

9. The apparatus of claim 8 wherein the transceiver is configured to forward the received data to the next point in the transmission path, before it has been fully determined whether or not the received data is corrupt.

10. The apparatus of claim 8 wherein re-forward the received data includes:
    receive a new resource block allocation; and
    transmit the received data to the next point in the transmission path.

11. The apparatus of claim 8 wherein re-forward the received data includes, without waiting for the receipt of a new resource block allocation:
    transmit the received data to the next point in the transmission path; and
    transmit a transmission message to the next point in the transmission path indicating that the received data was uncorrupt when received.

12. The apparatus of claim 8 wherein the transceiver is configured to use a Hybrid Automatic Repeat-Request (HARQ) protocol.

13. A method of transmitting data via a wireless transmission path that includes a user equipment, a base station, and at least one relay station as an intermediate point, the method comprising:
    receiving, from the base station, a resource block allocation allowing for the transmission of data to a next point in the transmission path;
    receiving a data transmission from a prior point in the transmission path, wherein the data transmission includes error detection information;
    determining, using at least in part the error detection information, if the data is corrupt; and
    if the data is corrupt,
    requesting that the data be retransmitted by the prior point of the transmission path, and not using the resource block allocation.

14. The method of claim 13 further including, if the data was corrupt, preventing the forwarding of the corrupt received data.

15. The method of claim 13 further including, if the received data was not corrupt:
    forwarding the data to the next point in the transmission path;
    receiving a receipt message from the next point indicating whether or not the forwarded data was corrupt;
    if the forwarded data was corrupt, re-forwarding the data to the next point; and
    if the forwarded data was not corrupt, indicating that the resource block allocation was used.

16. The method of claim 13 wherein receiving a data transmission includes using a Hybrid Automatic Repeat-Request (HARQ) protocol.

17. The method of claim 13 wherein requesting that the data be retransmitted includes:
    transmitting an error message to both the prior point of the transmission path and to the next point of the transmission path.

18. The method of claim 13 further including, if the data was corrupt,
    transmitting an error message to the base station; and
    wherein the error message indicates both that the data was corrupt and at which point of the transmission path the corruption was first detected.

19. The method of claim 13 further including:
    substantially simultaneously to determining if the data has been correctly received, forwarding the received data to the next point in the transmission path regardless er of whether or not it is corrupt; and
    after determining if the received data is corrupt, transmitting a message to the next point in the transmission path that indicates whether or not the received data is corrupt.

20. The method of claim 19, wherein receiving a data transmission from a prior point in the transmission path includes receiving a message indicating that the prior point received the data in a corrupted state; and
    further including, transmitting a message to the next point in the transmission path indicating that the data was received in a corrupt state from the prior point in the transmission path.

21. The method of claim 20 wherein transmitting a message indicating that the data was received in a corrupt state includes:
    skipping determining, using at least in part the error detection information, as to whether or not the data is corrupt, and
    automatically considering the data to be corrupt.

22. An apparatus comprising:
    a wireless transceiver configured to:
        receive a resource block allocation allowing for the transmission of data to a next point in a transmission path, wherein the transmission path includes a user equipment as an end point, a base station as an end point, and at least one apparatus as an intermediate point, and
        receive a data transmission from a prior point in the transmission path, wherein the data transmission includes error detection information; and
    a controller configured to determine, using at least in part the error detection information,
    if the data is corrupt, and
    if the data is corrupt,
        request that the data be retransmitted by the prior point of the transmission path, and not using the resource block allocation.

23. The apparatus of claim 22 wherein the controller is configured to, if the data was corrupt, prevent the forwarding of the corrupt received data.

24. The apparatus of claim 22 wherein the transceiver is configured to, if the received data was not corrupt:
    forward the data to the next point in the transmission path;
    receive a receipt message from the next point, wherein the receipt message indicates whether or not the forwarded data was corrupt;
    if the forwarded data was corrupt, re-forward the data to the next point; and
    if the forwarded data was not corrupt, indicate that the resource block allocation was used.

25. The apparatus of claim 22 wherein the transceiver is configured to,
    forward the received data to the next point in the transmission path, before it has been fully determined whether or not the received data is corrupt; and
    after the determination whether or not the received data is corrupt has occurred, transmit a message to the next point in the transmission path, wherein the message indicates whether or not the received data is corrupt.

* * * * *

UNITED STATES PATENT AND TRADEMARK OFFICE
CERTIFICATE OF CORRECTION

PATENT NO. : 8,458,550 B2  
APPLICATION NO. : 12/920658  
DATED : June 4, 2013  
INVENTOR(S) : Haifeng Wang, Ting Zhou and Jing Xu Page 1 of 1

It is certified that error appears in the above-identified patent and that said Letters Patent is hereby corrected as shown below:

In the Claims:

Claim 19:
Column 19, line 50, "regardless er" should be -- regardless --.

Signed and Sealed this
Sixth Day of August, 2013

Teresa Stanek Rea
*Acting Director of the United States Patent and Trademark Office*